July 21, 1931.  M. J. DONER  1,815,614
RIGHT AND LEFT TURN VEHICLE SIGNAL
Filed June 3, 1929  2 Sheets-Sheet 2
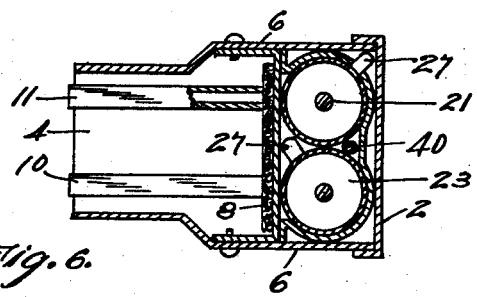
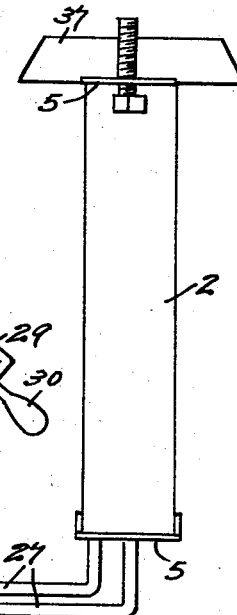
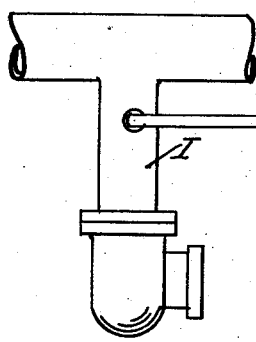
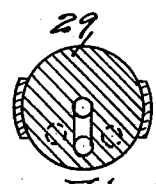
INVENTOR,
M. J. Doner;
BY
his ATTORNEY.

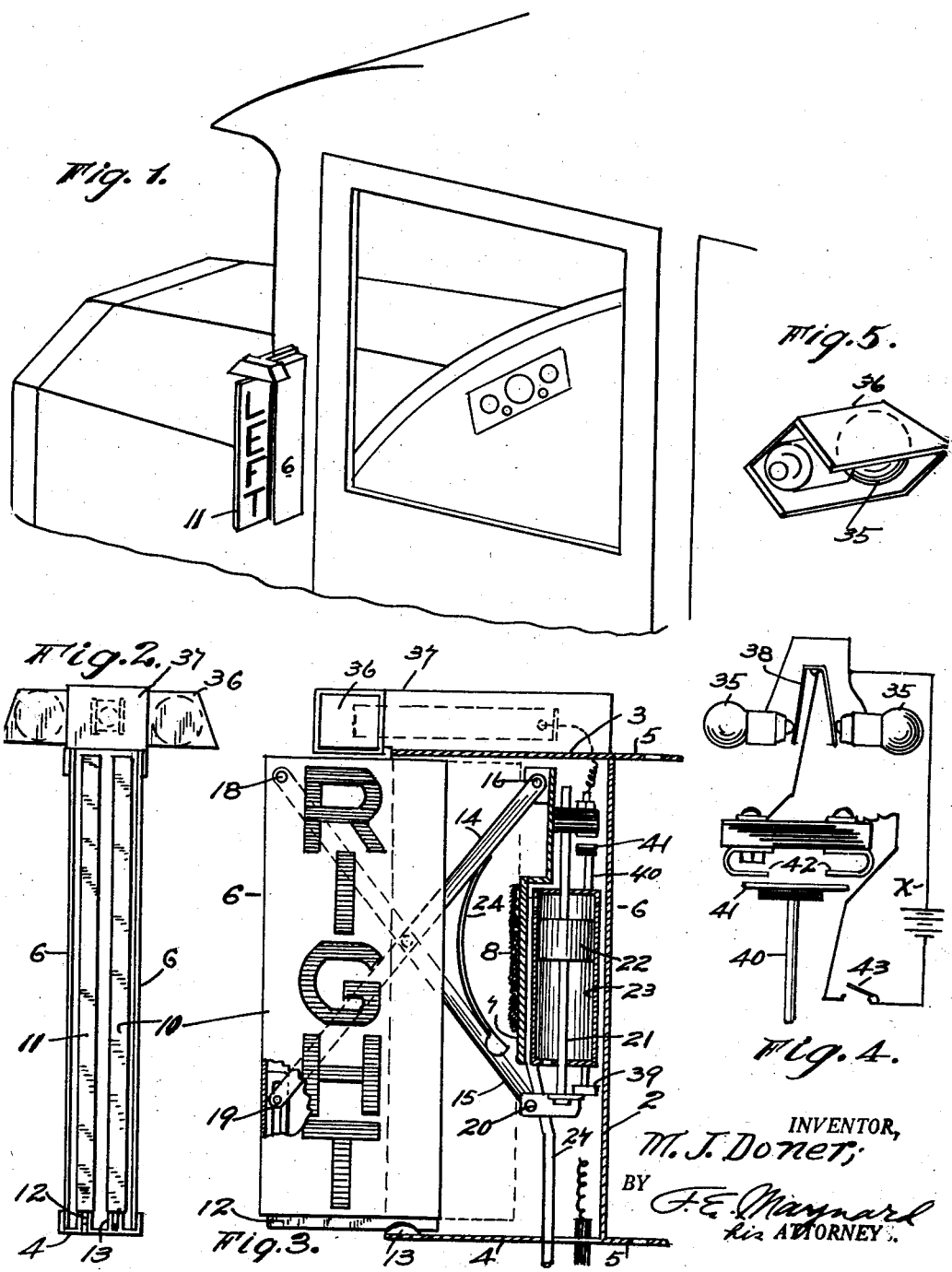

Patented July 21, 1931

1,815,614

UNITED STATES PATENT OFFICE

MARTIN J. DONER, OF LOS ANGELES, CALIFORNIA

RIGHT AND LEFT TURN VEHICLE SIGNAL

Application filed June 3, 1929. Serial No. 368,069.

This invention relates to traffic signals and more especially to signals for attachment to road vehicles to indicate an intended turn.

An object of the invention is to provide a simple, practical and low price accessory for ready attachment to a road vehicle of self-propelled type utilizing an internal combustion motor.

A further object is to provide a right and left turn signal device combined with the motor so as to utilize its lower pressure, fuel suction manifold for producing a sub-atmospheric pressure in a local motor of the signal device.

Another object is to provide an automatically retractive or negating signal mechanism.

Other objects, advantages and features of construction and combination will be made manifest in the ensuing description of the herewith illustrative embodiment; it being understood that modifications, variations and adaptations may be resorted to within the scope, principle and spirit of the invention as it is hereinafter more directly claimed.

Figure 1 is a perspective showing the device as installed on a motor vehicle.

Figure 2 is a front, edge view of the device.

Figure 3 is a vertical section of the housing and certain inner parts.

Figure 4 is a circuit diagram of light means.

Figure 5 is a perspective of a demounted lamp hood.

Figure 6 is a cross-section on line 6—6 of Fig. 3; but showing retracted sign panels.

Figure 7 is a sectional view of the manual control valve and a diagram of the fluid tubes of the pneumatic motor.

Figure 8 is a plan of the signal control valve.

As here shown the signal apparatus includes a box or housing having a back 2, a top 3 and a bottom 4 with mounting brackets 5. Side walls 6 are secured to an inner partition 7 which is faced with a pad 8.

The box is entirely open from top to bottom at its front or outer part and forms a chamber in which are slidably mounted two sign panels 10 and 11 of hollow structure and open at their vertical rear edges. The bottoms of the panels have fins 12 which are guided in lugs 13 and each panel is hung on a respective lazy tong bracket formed by a pair of pivotally crossed arms 14—15 whose upper ends are pivoted at 16 to the partition 7 and at 18 to the outer top corner of the respective panel.

The lower end of the arm 14 is slidably related to its panel by a pin and slot connection 19 and the lower end of the arm 15 is pivotally connected at 20 to a respective piston rod 21 of a piston 22 in a cylinder 23, of which there is one for each sign panel 10—11.

The arms 14—15 are constantly under effort of a spring 24, attached to one arm and sliding on the other, to pull the panel into the box.

The two cylinders 23 are set side-to-side and at the bottom each opens freely to the atmosphere and at the top portion each has a vacuum tube connection 27 leading to a control valve 28 having a movable part 29, operative by lever 30, to open communication to a vacuum tube 31 which taps into the engine intake I.

One panel, as 10 has its opposite faces provided with bright, word legend " Right," and the other panel, 11, has its faces provided with the word " Left " and when the lever 30 is pressed to the right (for signaling a right turn) the valve disc 29 opens a port in the valve to connect the tube 31 and that tube 27 which leads to the motor cylinder of the panel 10.

The result is that atmospheric pressure acts on the piston 22 and by its rod 21 pulls up the arm 15 and the bracket thus quickly pushes out the sign panel to show a right turn.

As soon as the lever 30 is brought neutral the displayed panel, 10 or 11, is pulled back by its spring 24 into concealed position in the box.

Means are provided whereby the sign is brightly illuminated for night use and is automatically operative when a signal is set. This means includes a set of lamps 35 mounted in hoods 36 attached to a top shell 37 in which is secured a forked contact 38 to yieldably engage the buttons of the lamps 35, whose sockets are grounded to the box. Each piston rod 21, when moving up, strikes a push bar 39 having a guided rod 40 on the top of which is a circuit closing bridge 41 engagable with spring posts 42 one of which is wired to the dual contact yoke 38 while the other has a lead to a manual, master switch 43 to close the circuit X, Fig. 4. The lamps 35 are concurrently energized to illuminate both faces of the projected signal panel.

As soon as the operative piston 22 of a displayed panel is released by closure of its valve 27 the relative spring 24 pulls back the panel and the lamp circuit is broken at the bridge contact 41.

Either signal may be shown instantly at any time that the engine served by the intake manifold I is in operation and a partial vacuum obtains in the tube 31.

What is claimed is:

1. A vehicle turning signal device including a pair of vacuum cylinders having atmospheric pressure pistons, a valved vacuum tube to the cylinders, a pair of signal panels, a lazy-tongs bracket for each panel and connected to a respective piston to project a panel at will, and means for automatically retracting a projected panel and including a spring device reacting between arms of the lazy-tong bracket, said device consisting of a spring bar fixed to one member of the lazy-tong and bearing against a coacting member thereof.

2. A vehicle turning signal device including a pair of vacuum cylinders having atmospheric pressure pistons, a valved vacuum tube connected to the cylinders, a pair of signal panels, a lazy-tongs bracket for each panel and connected to a respective piston to project a panel at will; said bracket including a pair of crossed levers whose upper arms are pivoted to a relative fixed bearing and to the upper end of its panel, and whose lower ends are connected for compensating movement, one to a piston and the other slidably to its panel.

3. In combination, an intake or vacuum manifold for a gas engine, a set of signal panels respectively for right and left turns of a vehicle, spring means to draw the panels to ineffective position, and vacuum motors having valved connection with said manifold and operative by atmospheric pressure to set either panel for display at will against spring effort.

4. In a vehicle turning signal accessory, a casing a vertical slide moving horizontally therein, a lazy-tong connecting the slide and the casing, a motor in the casing for projecting the slide, and a spring device carried by the lazy-tong and acting to automatically retract the slide when released by the motor.

MARTIN J. DONER.